United States Patent [19]

McIver et al.

[11] 3,900,724

[45] Aug. 19, 1975

[54] ASYNCHRONOUS BINARY MULTIPLIER USING NON-THRESHOLD LOGIC

[75] Inventors: George W. McIver, Redondo Beach; James L. Buie, Panorama City, both of Calif.

[73] Assignee: TRW Inc., Redondo Beach, Calif.

[22] Filed: Feb. 11, 1974

[21] Appl. No.: 441,099

[52] U.S. Cl. .................................. 235/164; 235/176

[51] Int. Cl. ............................ G06f 7/50; G06f 7/52

[58] Field of Search ..................... 235/164, 176, 175

[56] References Cited

UNITED STATES PATENTS

| | | | |
|---|---|---|---|
| 3,506,817 | 4/1970 | Winder | 235/176 |
| 3,602,705 | 8/1971 | Cricchi | 235/175 |
| 3,752,971 | 8/1973 | Calhoun et al. | 235/164 |
| 3,766,371 | 10/1973 | Suzuki | 235/175 |
| 3,795,880 | 3/1974 | Singh et al. | 235/164 |

*Primary Examiner*—David H. Malzahn

*Attorney, Agent, or Firm*—Daniel T. Anderson; Jerry A. Dinardo; Stephen J. Koundakjian

[57] ABSTRACT

A sequential-add multiplier possessing high operating speed and high packing density in integrated form employs non-threshold logic to form a full adder at each one of its computational nodes. The full adder is made up of a combination of pnp multiple emitter transistors in emitter follower configuration forming eight AND gates coupled to a combination of npn multiple emitter transistors in emitter follower configuration forming four OR gates.

15 Claims, 25 Drawing Figures

| CELL | FIG. NO. | CELL | FIG. NO. |
|---|---|---|---|
| A | 11 | E | 17 |
| B | 12 | F | 18 |
| B1 | 13 | G1, G2 | 19 |
| B2 | 14 | R | 20 |
| C | 15 | S | 21 |
| D | 16 | | |

| RESISTOR | VALUE | RESISTOR | VALUE |
|---|---|---|---|
| R1 | 20K | R9 | 40K |
| R2 | 10K | R10 | 3.5K |
| R3 | 20K | R11 | 500Ω |
| R4 | 4K | R12 | 2.5K |
| R5 | 10K | R13 | 1K |
| R6 | 10K | R14 | 5K |
| R7 | 40K | R15 | 1K |
| R8 | 15K | | |

PATENTED AUG 19 1975 3,900,724

ASYNCHRONOUS BINARY MULTIPLIER USING NON-THRESHOLD LOGIC

BACKGROUND OF THE INVENTION

Modern computers use hard wired multipliers rather than using the adder and software to do a multiply operation. It is desirable to put the whole multiplier on a single LSI chip in order to reduce interconnections and increase reliability. Unfortunately, this is not practical for most design approaches because the size of the resulting chip is so great.

SUMMARY OF THE INVENTION

This invention makes it possible to put a 16 × 16 bit multiplier on a single chip whose largest dimension is less than a fraction of an inch; this makes it feasible for fabrication using the triple diffusion process as well as the epitaxial process. The logic form used is essentially emitter follower logic, with the full truth table being implemented for the full adder rather than reducing to simplest expressions. This actually saves space for this function, as each truth table entry is used for two or more outputs. Further savings in space are realized by the simplicity of the interconnect scheme, which allows the elements to be laid out in a simple matrix interconnected with straight lines.

The advantages of this approach over others are primarily two. First, the multiplier array has a greater density of bits, which allows a large multiplier to be accommodated on a single chip. The other advantage results from the use of non-threshold logic, and this advantage is that of higher speed. Since the emitter follower logic elements that are used have no thresholds in themselves and are always active, only rise times are encountered rather than the usual combination of delays plus rise times. Hence, the outputs are characterized by a rise time which is not the linear sum of rise times in the longest path, but is rather the square root of the sum of the squares for those rise times, which is much smaller number.

According to a preferred embodiment, the invention uses long chains of emitter follower logic elements to achieve very fast operation. It further uses multiple emitter npn transistors in emitter follower connection for outputs and multiple emitter pnp transistors in emitter follower connection are used as inputs. This lends itself very readily to direct implementation of the truth table, with a resulting great savings in the required space.

DESCRIPTION OF THE PREFERRED EMBODIMENT

ASYNCHRONOUS SEQUENTIAL-ADD PROCESS

The multiplier according to the invention is based in part on the use of an asynchronous sequentialadd technique which provides a much higher speed multiplication than the conventional shift-and-add approach. If two numbers $$X = X_0 2^0 + X_1 2^1 + X_2 2^2 + \ldots + X_{m-1} 2^{m-1}$$

$$Y = Y_0 2^0 + Y_1 2^1 + Y_2 2^2 + \ldots + Y_{n-1} 2^{n-1}$$

are to be multiplied, the product is formed by summing all of the cross products, $$P = \sum_{i=0}^{m-1} \sum_{j=0}^{n-1} X_i Y_j 2^{i+j}$$

Figure 1:
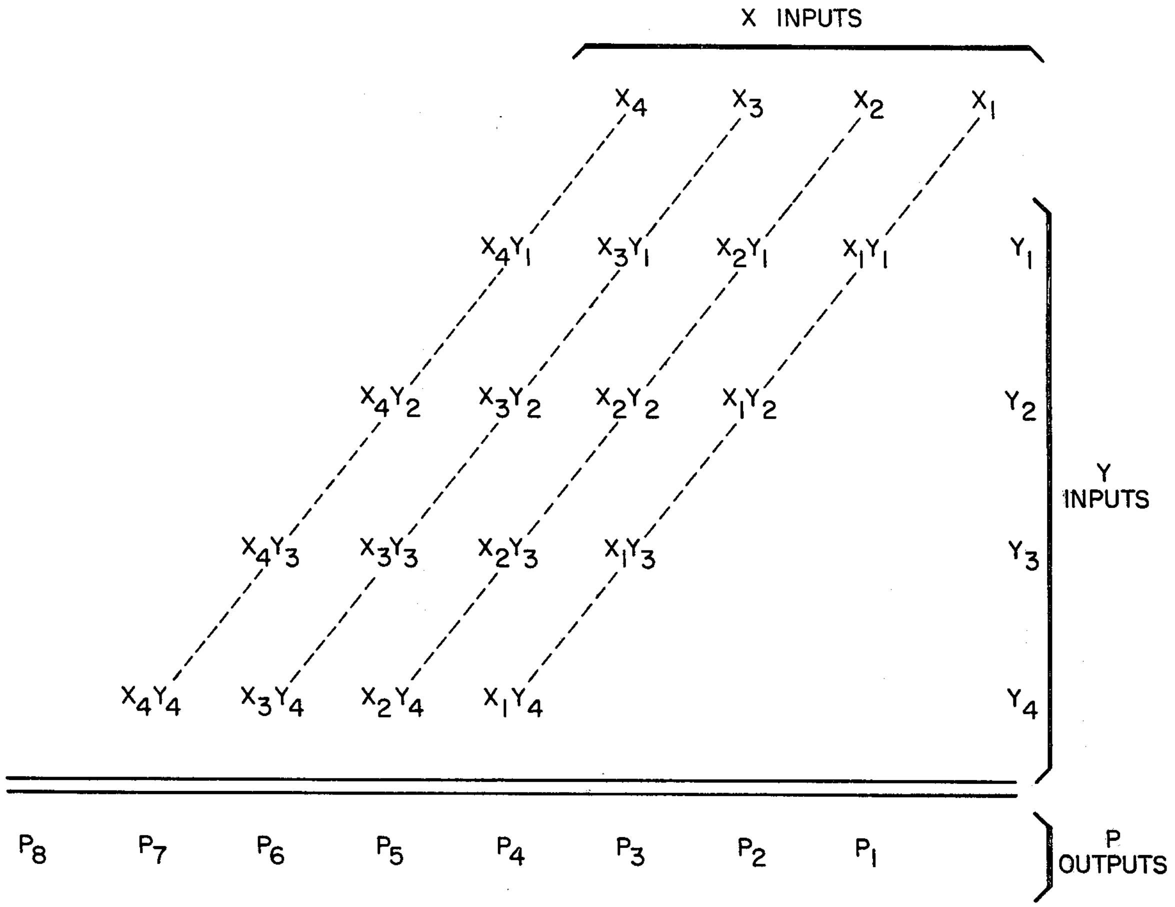
FIG. 1 is a diagram showing the matrix of computational nodes associated with the process of multiplying two numbers by summing all of the cross products.

With reference to FIG. 1, this is conventionally computed via the shift-and-add technique by first forming the partial products of $Y_1$ and $X_1$ through $X_m$, and then shifting these products one position to the right. Secondly, the partial products of $Y_2$ and $X_1$ through $X_m$ are formed and added to the first computation. This summation is shifted one position to the right and the procedure is repeated until all of the partial products have been formed, added, and shifted.

The sequential-add technique executes essentially the same algorithm; however, it computes asynchronously without shifting. It forms all of the partial products listed in FIG. 1 simultaneously. Equally weighted partial product-sum terms are added in verticl columns together with equally weighted carry terms added diagonally from the right hand column. Thus, in the process of multiplying the two four digit numbers of FIG. 1, $P_1 = X_1 Y_1$, $P_2 = (X_2 Y_1 + X_1 Y_2) + (C_{X_1 Y_1})$, $P_3 = (X_3 Y_1 + X_2 Y_2 + X_1 Y_3) + (C_{X_1 Y_2} + C_{X_2 Y_1})$ etc., for all output product-terms (Note, $C_{X_1 Y_1}$ means the carry term resulting from the partial product of $X_1$ and $Y_1$, etc.)

The sequential-add technique is consequently much faster than the shift-and-add technique, since a large part of the computation occurs simultaneously. The sequentialadd multiplier utilizes the iterative building block shown in FIG. 2 at each computational node shown in the matrix of FIG. 1. The $X_i Y_j$ terms are generated by AND gates. These partial products are added to the vertically transferred sum and diagonally transferred carry terms from adjacent computational nodes. The result is the overall 4 × 4 multiplier block diagram shown in FIG. 3.

Figure 2:
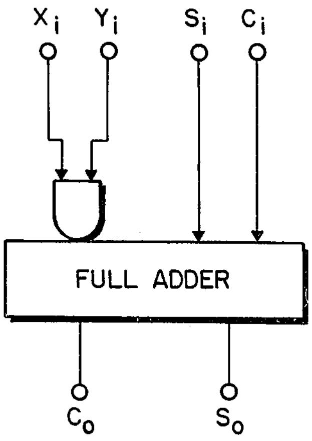
FIG. 2 is a diagram showing the iterative building block used at each computational node in the matrix of FIG. 1 and forming a part of the sequential-add multiplier according to the invention.
Figure 3:
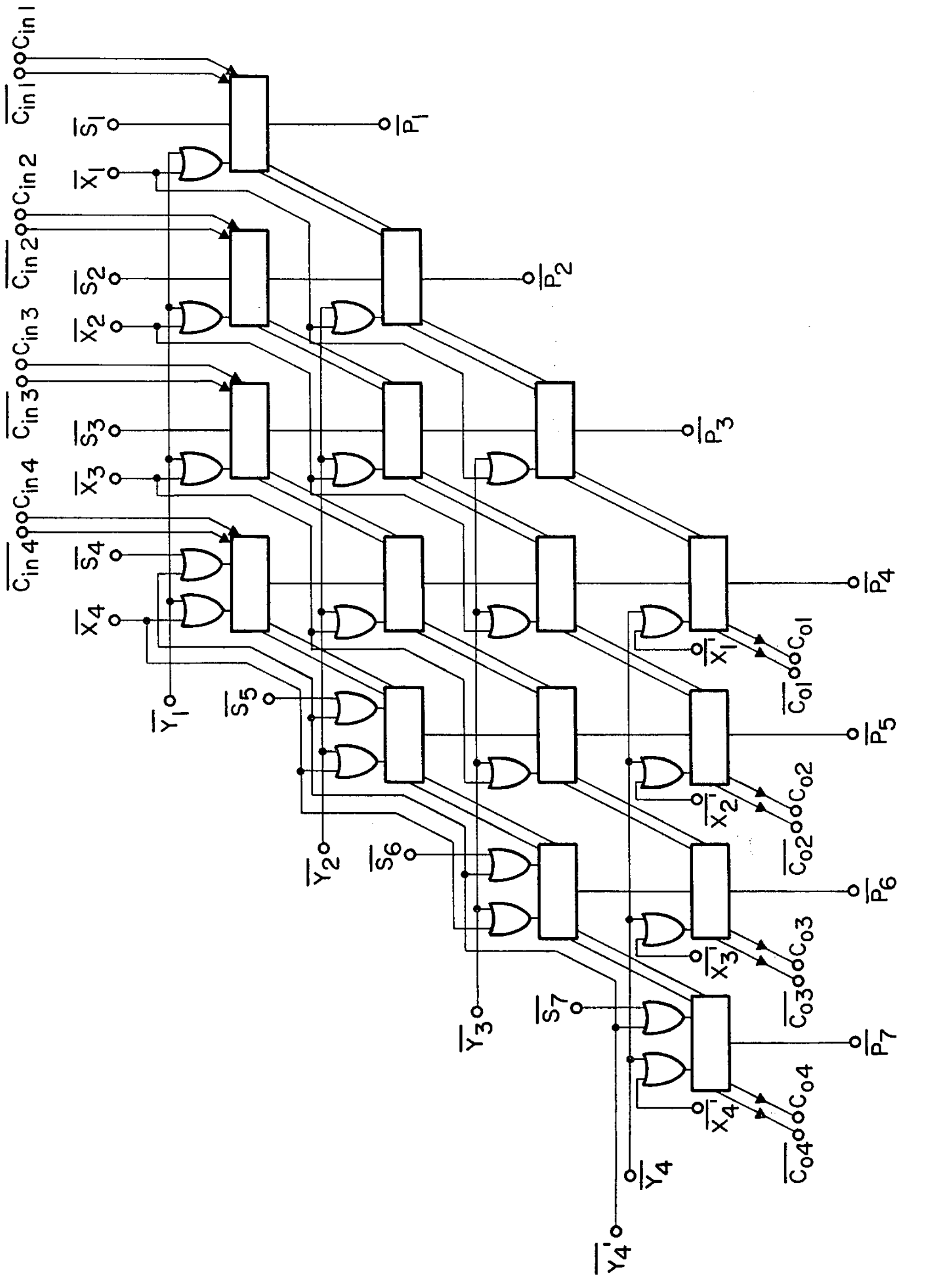
FIG. 3 is a block diagram of a 4 × 4 multiplier utilizing an array of iterative building blocks similar to that shown in FIG. 2 but also including complementary carry signals.

It can be shown that the worst case propagation delay through a sequential-add multiplier array using standard thresholding logic functions is $$t_{Td} = (M + N - 1)\ t_{Ad}$$

where $t_{Td} \equiv$ worst case total delay through the multiplier $M \equiv$ number of bits on the X input $N \equiv$ number of bits on the Y input $t_{Ad} \equiv$ delay through the adder iterative block shown in FIG. 2.

Therefore, the following delays would be expected, as shown in the following Table 1.

TABLE 1

| Multiplier Size | Normalized Delay | (4 × 4 − 1) Total Delay ($t_{Ad}$ = 4 nsec) |
|---|---|---|
| 4 × 4 | 7 $t_{Ad}$ | 28 nsec |
| 4 × 8 | 11 | 44 |
| 4 × 12 | 15 | 60 |
| 8 × 8 | 15 | 60 |
| 8 × 12 | 19 | 76 |
| 12 × 12 | 23 | 92 |
| 16 × 16 | 31 | 124 |
| 20 × 20 | 39 | 156 |
| 24 × 24 | 47 | 188 |

NON-THRESHOLD LOGIC

Another feature of the invention is the use in a multiplier of non-threshold logic. Non-threshold logic is a technique of performing logic operations with non-inverting, unity gain OR and AND functions. The propagation time through a logic matrix is therefore similar to the delay through a chain of linear amplifiers, which is best approximated as an RSS function. This is contrasted to an algebraic accumulation of delays with conventional logic techniques. Herein lies the advantage, a $\sqrt{N}$ factor improvement in the delay-power product performance over conventional techniques, where N is the number of logic operations being performed. Therefore, non-thresholding techniques are best suited to long propagation path logic functions. This is shown in the following Table 2.

TABLE 2

| Number of Stages | Delay | | |
|---|---|---|---|
| | Non-Threshold | Conventional | Patio Improvement |
| 2 | $\sqrt{2}\ t_d$ | 2 $t_d$ | 1.4 |
| 4 | 2 $t_d$ | 4 $t_d$ | 2.0 |
| 8 | $2\sqrt{2}\ t_d$ | 8 $t_d$ | 2.8 |
| 16 | 4 $t_d$ | 16 $t_d$ | 4.0 |
| 32 | $4\sqrt{2}\ t_d$ | 32 $t_d$ | 5.6 |
| 64 | 8 $t_d$ | 64 $t_d$ | 8.0 |

Figure 4:
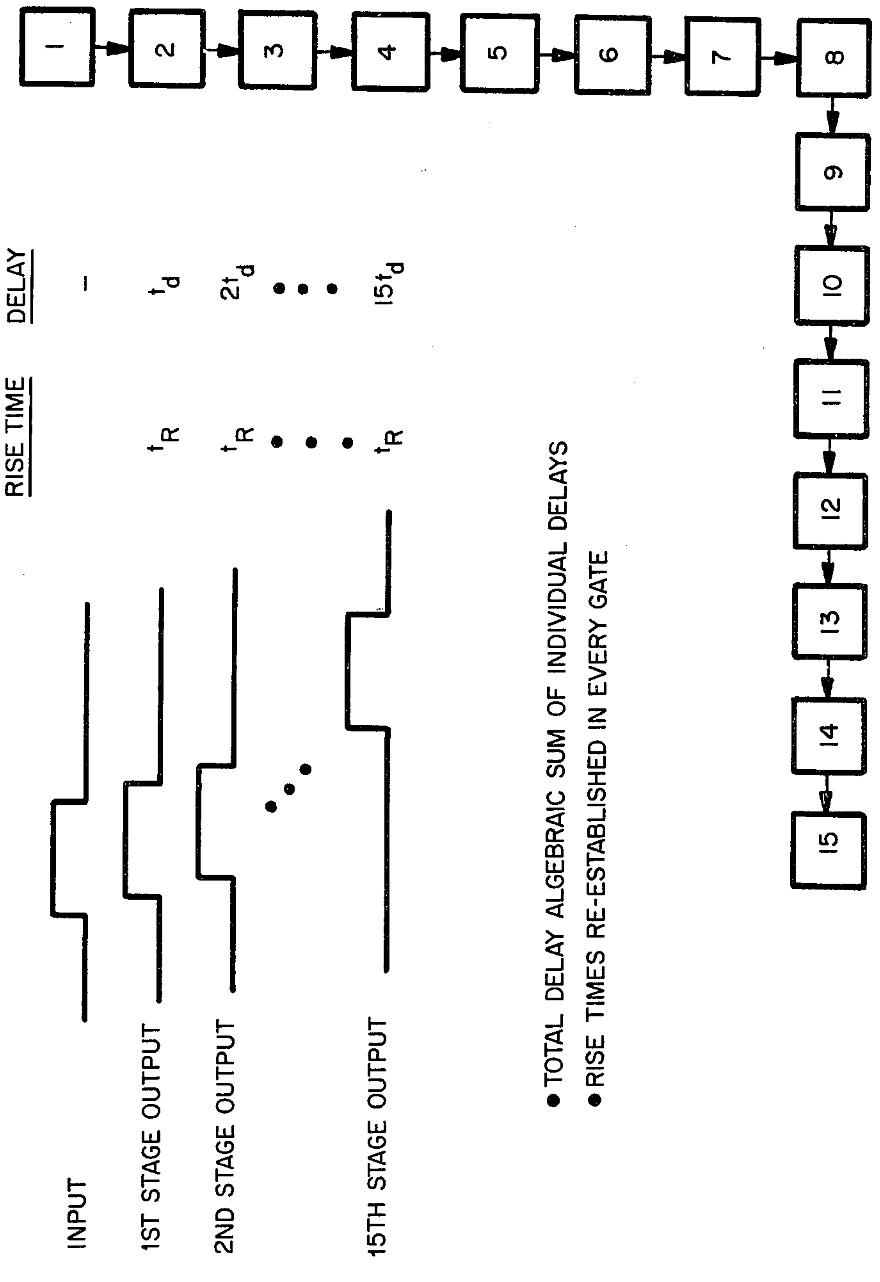
FIG. 4 is a diagram showing the delay effects of a signal propagating through 15 conventional logic stages.
Figure 5:
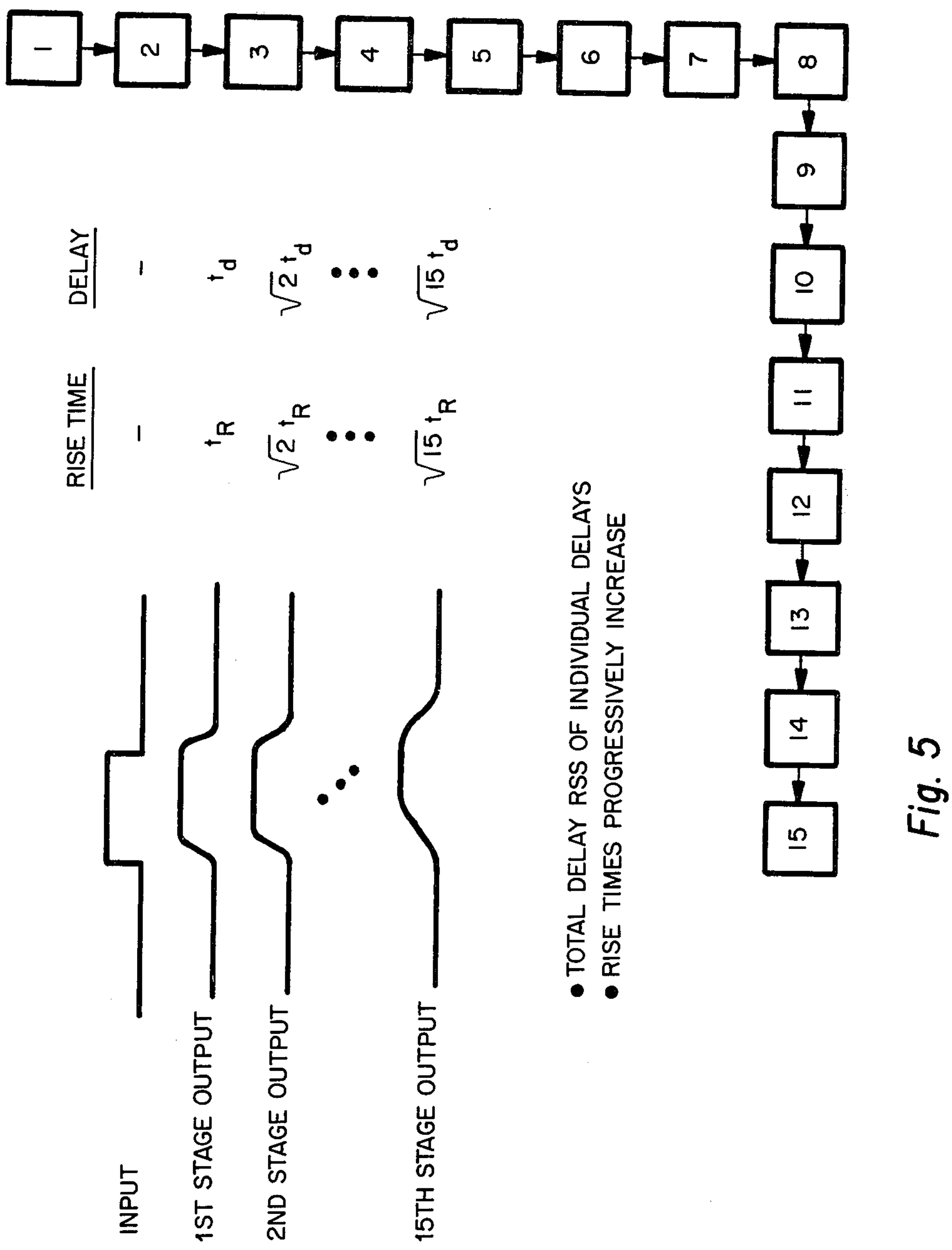
FIG. 5 is a diagram showing the delay effects of a signal propagating through 15 stages of non-threshold logic according to the invention.

This concept can be illustrated further with FIGS. 4 and 5. FIG. 4 shows the effect of a signal propagating through 15 conventional logic stages. The total delay is the algebraic sum of the delays contributed by each stage. As the signal propagates through each stage, it is compared with a threshold value. When the signal passes the threshold, the output of that stage changes to the opposite state. The rise and fall times together with the dc logic levels are restored at each stage because the gain of each stage is considerably greater than one. The restoration properties of each gate provide the noise immunity which is required for implementing a system function with non-LSI technology.

FIG. 5, in turn, shows the effect of a signal propagating through 15 non-threshold stages. Instead of a pure delay being introduced at each stage, the rise and fall times are increased by the square root of the number of logic stages. Also, the logic levels are progressively modified. At the end of the logic chain, the signal is passed through a conventional thresholding gate to reestablish logic levels and rise and fall times. This permits data storage, reclocking, and/or transmitting the signal off chip. Non-threshold logic is ideal for LSI because the internal noise environment is well-defined and controllable. Interface logic will use conventional gating techniques to maintain adequate noise immunity off chip.

Figure 6:
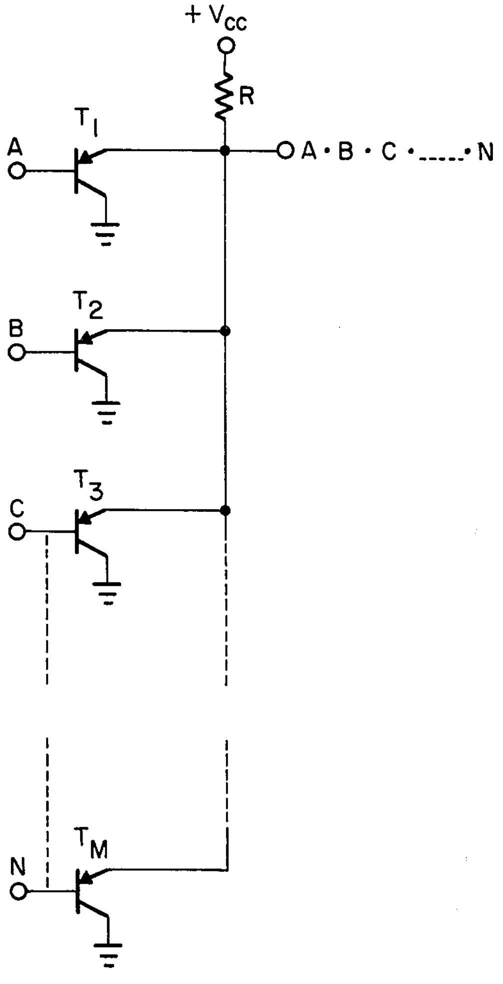
FIG. 6 is a schematic circuit diagram showing an arrangement of pnp transistors forming an AND gate.

The AND gate of FIG. 6 illustrates one example of non-threshold logic. In this AND gate a plurality of pnp transistors $T_1$, $T_2$, $T_3$ . . . $T_n$ are connected with their emitters in common and in series with a common load resistor R to a positive voltage supply $+V_{cc}$. The collectors are grounded. Input signals A, B, C, . . . N are coupled separately to the individual bases. Each of the transistors is connected as an emitter follower.

FIG. 6 is an AND gate for positive logic; that is a high positive level represents a logic 1 and a low positive level represents a logic 0. Since the emitters are all connected in common, the output voltage will be one diode drop above the lowest input voltage. Thus, if any, one of the input signals is LOW, the output is LOW. The output is HIGH only when all of the input signals are HIGH. The conditions for an AND gate are thereby met.

Figure 7:
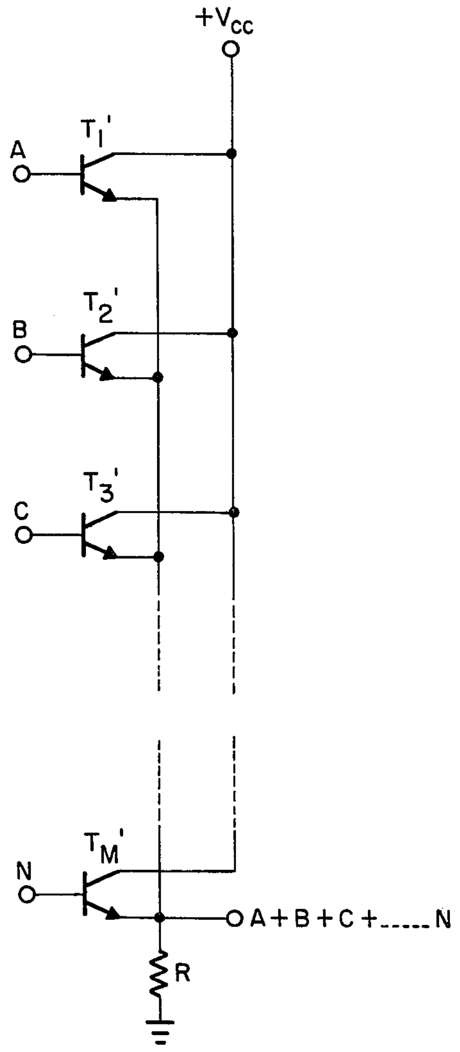
FIG. 7 is a schematic circuit diagram showing an arrangement of npn transistors forming an OR gate.

In FIG. 7, a plurality of npn transistors $T'_1$, $T'_2$, $T'_3$ . . . $T'_n$ are connected in emitter follower arrangement to form an OR gate for positive logic. The emitters are connected in common and in series with a common load resistor R to ground. The collectors are connected to a positive supply $+V_{cc}$. Input signals A, B, C, . . . N are applied to the individual bases.

In this circuit, the common emitter output voltage will be one diode drop below the highest input voltage. Thus if any one or more of the input voltages is HIGH, the output voltage is HIGH. The output voltage is LOW only when all of the input voltages are LOW. The conditions for an OR gate are thereby met.

Figure 8:
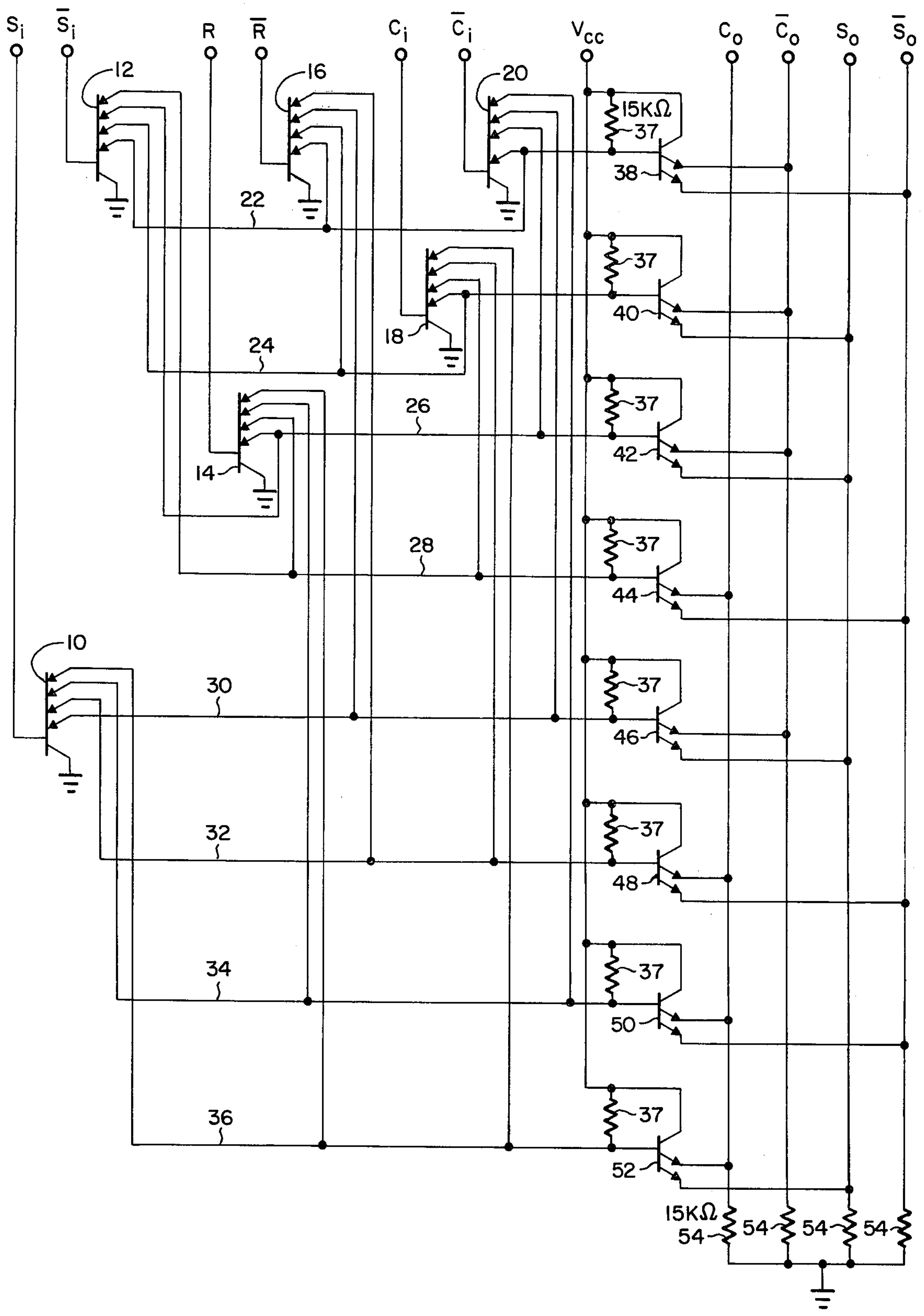
FIG. 8 is a schematic circuit diagram of a full adder having a multiplicity of pnp input emitter follower transistors arranged to form AND gates and coupled to a multiplicity of npn output emitter follower transistors arranged to form OR gates.

FIG. 8 is a circuit diagram for the full adder portion of a one bit multiplier. The circuit corresponds to the block diagram shown in FIG. 2, with the one bit product R in the circuit corresponding to the product obtained by multiplying the $X_i$ and $Y_i$ terms in FIG. 2.

In FIG. 8 there is shown six input lines drawn vertically and labeled $S_i$, $\bar{S}_i$, R, $\bar{R}$, $C_i$, $\bar{C}_i$, and four output lines labeled $C_o$, $\bar{C}_o$, $S_o$, $\bar{S}_o$. The R and $\bar{R}$ lines transmit the one bit product; the $S_i$ and $\bar{S}_i$ lines transmit the sum input; the $C_i$ and $\bar{C}_i$ lines transmit the carry input; the $C_o$ and $\bar{C}_o$ lines transmit the carry output; and the $S_o$ and $\bar{S}_o$ lines transmit the sum output.

Each of the input lines is connected individually to the base of a separate one of six different pnp input transistors 10, 12, 14, 16, 18, 20. Each pnp input transistor is of the multiple emitter type, there being four emitters for each transistor, a common base, and a common collector. Each of the multiple emitter transistors can be replaced by four separate and distinct transistors.

The emitters of the six input transistors 10 to 20 are connected in groups of three to one of eight different horizontal bus lines, numbered evenly 22 to 36, and in series with one of eight different load resistors 37. When so connected as emitter followers, the input transistors from eight AND gates.

Each of the bus lines 22 and 36 is connected to the base of a separate one of eight different npn output transistors numbered evenly 38 to 52. Each output transistor has two emitters. The emitters of the output transistors 38 to 52 are connected in groups of four to one of the four output lines $C_o$, $\bar{C}_o$, $S_o$, $\bar{S}_o$ and also to one of four load resistors 54. When so connected as emitter followers, the multiple emitter output transistors 38 to 52 form four OR gates.

The operation of the full adder circuit of FIG. 8 will now be described. Assume the following conditions, namely that the input line R is LOW when it has 1 volt applied thereto and that its complement input line $\bar{R}$ is HIGH when it has 3 volts applied thereto, as shown; that the input line $S_i$ is LOW when it has 1.5 volts applied thereto and that its complement input line $\bar{S}_i$ is HIGH when it has 3.5 volts applied thereto; and that the input line $C_i$ is LOW when it has 1 volt applied thereto and that its complement input line $\bar{C}_i$ is HIGH when it has 3.5 volts applied thereto.

Since each of the eight horizontal bus lines 22 to 36 connect three pnp input emitter follower transistors in parallel, each one of these lines will come to a voltage that is one diode voltage drop above the lowest input voltage. Thus the horizontal bus line 22 connects emitters of transistors 12, 16, and 20. Since the bases of transistors 12, 16 and 20 are connected to input lines $\bar{R}$, $\bar{S}_i$, and $\bar{C}_i$, which have voltages of 3 volts, 3.5 volts, and 3.5 volts respectively, the first bus line 22 will be one diode drop, which is about 0.5 volt, above the lowest input voltage of 3 volts, or 3.5 volts, as shown.

Now the second bus line 24 connects emitters of transistors 12, 16, and 18, whose bases are connected to input lines $\bar{R}$, $\bar{S}_i$, and $C_i$, which have 3 volts, 3.5 volts and 1 volt respectively. Thus, the second bus line 24 will be at one diode drop, or 0.5 volts, above the lowest input voltage of 1 volt, or 1.5 volts.

Similarly, it can be shown that bus line 26 will be at 2 volts, bus line 28 at 1.5 volts, bus line 30 at 1.5 volts, bus line 32 at 1.5 volts, bus line 34 at 1.5 volts and bus line 36 at 1.5 volts. It can be seen that the first bus line 22 with 3.5 volts is higher than any of the other bus lines which are at 2 volts or lower. Accordingly, bus line 22 is HIGH and all the other bus lines are LOW.

Now with regard to the output npn emitter follower transistors 38 to 52, the emitter output voltage is one diode drop below the highest input voltage. Thus, the $C_o$ output line connects emitters of transistors 44, 48, 50, 52, whose bases are at 1.5 volts, 1.5 volts, 1.5 volts, and 1.5 volts respectively. The emitters connected to the $C_o$ output line are 0.5 volt below 1.5 volts or 1 volt. Similarly, the $\bar{C}_o$ output line is 0.5 volt below 3.5 volts or 3 volts; the $S_o$ output line is 0.5 volt below 2.0 volts or 1.5 volts; and the $\bar{S}_o$ output line is 0.5 volt below 3.5 volts or 3 volts.

The $C_o$ output, being 1 volt, is LOW and its complement $\bar{C}_o$ output, being 3 volts, is HIGH. The $S_o$ output, being 1.5 volts, is LOW and its complement $\bar{S}_o$ output, being 3 volts, is HIGH. Now, because the circuitry employed herein is non-thresholding, the output voltages as noted above are transmitted without modification directly to the next stage and so on for as many stages as can be accommodated within the allowable limits of signal degradation. The signal voltages are transmitted between stages without regard to their HIGH or LOW status. That is, no additional circuitry such as threshold detectors are employed to determine whether the output is HIGH or LOW.

In thresholding circuitry, in contrast to the non-thresholding circuitry employed herein, threshold detectors would be used between the stages of the multiplier to make a decision as to which of the output signals are HIGH and LOW. On the basis of this decision, the threshold circuitry would then pass on a fixed voltage such as 5 volts on the HIGH signal line and zero volts on the LOW signal line.

It will be recalled that the first horizontal bus line 22 connecting the emitters of the three input transistors 12, 16, and 20 was HIGH when all three bases of those transistors were HIGH, and that all of the other bus lines 24 to 36 were LOW when any one or more of the bases of the input transistors 10 to 20 connected to those lines were LOW. The conditions for 8 AND gates are thereby satisfied by the input transistors 10 to 20.

It will also be noted that the output line $\bar{C}_o$ will be HIGH when any one or more of the four emitters of transistors 38, 40, 42, 46 connected to it are HIGH, as determined by the voltages on their bases connected to bus lines 22, 24, 26, and 30. Conversely, output line $\bar{C}_o$ will be LOW only when all four of these bus lines are LOW. Similar logic statements can be made for the other three output lines $C_o$, $S_o$, and $\bar{S}_o$. The conditions for 4 OR gates are thereby satisfied by the output transistors 38 to 52.

The truth table for the circuit of FIG. 8 is shown below in Table 3, as follows:

TABLE 3

| BUS LINE | $S_i$ | $\bar{S}_i$ | R | $\bar{R}$ | $C_i$ | $\bar{C}_i$ | $C_o$ | $\bar{C}_o$ | $S_o$ | $\bar{S}_o$ |
|---|---|---|---|---|---|---|---|---|---|---|
| 22 | 0 | 1 | 0 | 1 | 0 | 1 | 0 | 1 | 0 | 1 |
| 24 | 0 | 1 | 0 | 1 | 1 | 0 | 0 | 1 | 1 | 0 |
| 26 | 0 | 1 | 1 | 0 | 0 | 1 | 0 | 1 | 1 | 0 |
| 28 | 0 | 1 | 1 | 0 | 1 | 0 | 1 | 0 | 0 | 1 |
| 30 | 1 | 0 | 0 | 1 | 0 | 1 | 0 | 1 | 1 | 0 |
| 32 | 1 | 0 | 0 | 1 | 1 | 0 | 1 | 0 | 0 | 1 |
| 34 | 1 | 0 | 1 | 0 | 0 | 1 | 1 | 0 | 0 | 1 |
| 36 | 1 | 0 | 1 | 0 | 1 | 0 | 1 | 0 | 1 | 0 |

It will be seen that there is a one to one correspondence between the truth table and the physical arrangement of the circuit of FIG. 8. When the circuit is thus laid out to correspond to the truth table, there is an unexpected savings in space, for it turns out that such a design plan is the one that is the most conserving of space. It is also noted that in FIG. 8 all of the circuit components are arranged in a simple matrix with all of the interconnections made with straight horizontal or vertical lines, thereby affording further space savings.

While the full adder circuit of FIG. 8 is shown as being implemented by the use of bipolar transistors, it is understood that the same function can be performed by using enhancement mode MOS transistors simply by replacing pnp transistors with p channel MOS and replacing npn transistors with n channel MOS in each instance.

These principles have been applied to the design and layout of a 16 × 16 multiplier. This particular circuit was designed to use a 2's complement number system, but the same principles apply, independent of the number system.

The fractional 2's complement number field extends from −1 to $(1-2^{-(m-1)})$ where *m* is the word length. This number system is very convenient from the standpoint that it simplifies the hardware implementation of adders for computers, eliminates subtractors entirely, and also simplifies certain data acquisition equipment — notably A/D converters. For multipliers this is a less convenient system than sign-magnitude representation in that more kinds of logic blocks are required. However, the total parts count for the 2's complement multiplier is not significantly greater than the parts count of a sign-magnitude machine.

If $X_i$ is the *i*th bit of a number X, in fractional 2's complement notation, then $$X \equiv -1*X_0 + \sum_{j=1}^{m} X_j*2^{-j}$$

If P is the product of two such numbers X and Y, then $$P \equiv X*Y \equiv (-1*X_0 + \sum_{j=1}^{m} X_j*2^{-j})*(-1*Y_0 + \sum_{k=1}^{m} Y_k*2^{-k})$$

Performing the multiplication, one gets $$P = X_0*Y_0 - X_0*\sum_{k=1}^{m} Y_k*2^{-k} - Y_0 \sum_{j=1}^{m} X_j*2^{-j} + \sum_{j=1}^{m}\sum_{k=1}^{m} X_j*Y_k*2^{-(j+k)}$$

In order to eliminate the negative summations, the following relationship is employed:

$$\sum_{k=1}^{m} Z_k*2^{-k} = 1-(\sum_{k=1}^{m} \overline{Z}_k*2^{-k} + 2^{-m})$$

Thus,

$$P = X_0Y_0 - X_0 - Y_0 + X_0*(\sum_{k=1}^{m} \overline{Y}_k*2^{-k}) + X_0*2^{-m}$$

$$+ Y_0*(\sum_{j-1}^{m} \overline{X}_j*2^{-j}) + Y_0*2^{-m} + \sum_{j=1}^{m}\sum_{k=1}^{m} X_j*Y_k*2^{-(j+k)}$$

There are six different kinds of terms involved for the fractional 2's complement multiply. For a 16 × 16 multiplier they are:

1. The sign bit, $X_0*Y_0 - X_0 - Y_0$. Using modulo 2 arithmetic, $X_0*Y_0 - X_0 - Y_0$ is equivalent to $X_0 + Y_0$;
2. Terms $X_0*\overline{Y}_k*2^{-k}$, $k = 1, 15$;
3. Terms $\overline{X}_j*Y_0*2^{-j}$, $j = 1, 15$;
4. The term $X_0*2^{-15}$;
5. The term $Y_0*2^{-15}$;
6. The terms $X_j*Y_k*2^{-(j+k)}$, $j = 1, 15$, $k = 1, 15$;

Note that a sign magnitude multiplier would have a different function for the sign bit and would also have the terms of item 6. The terms in items 2, 3, 4 and 5 would vanish.

The multiply is performed by forming all the terms listed in items 1–6 and summing, as previously detailed.

Figure 9:
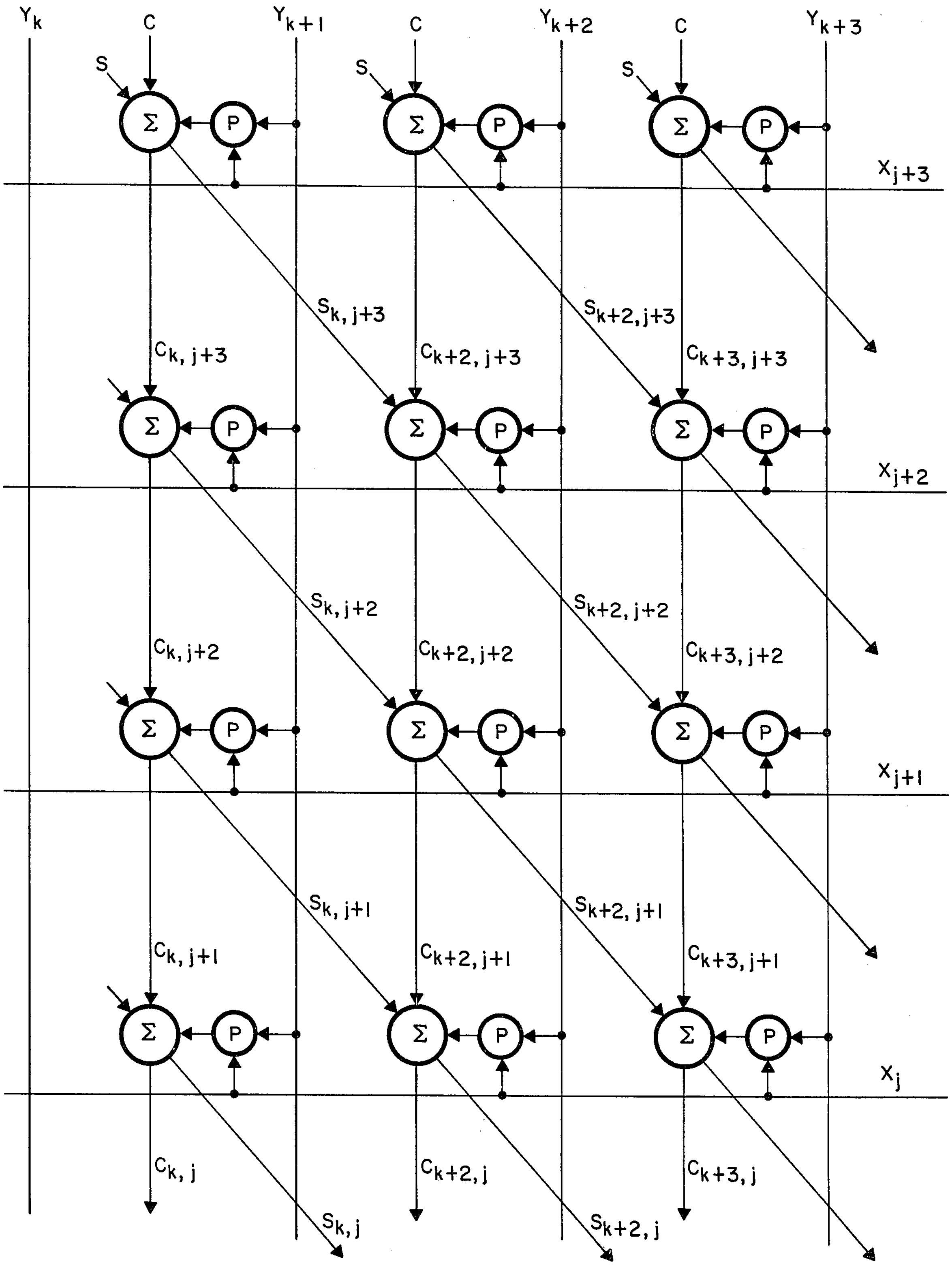
FIG. 9 is a diagram showing how full adders are interconnected in the interior of a multiplier matrix of arbitrary size.

FIG. 9 illustrates how the process is implemented. Cells at intersections with $X_{15}$ have no carry or sum inputs; therefore cells at intersections with $X_{14}$ may have sum inputs but no carry inputs. The term $Y_0*2^{-15}$ is implemented as a carry into the cell at $Y_0$,$X_{15}$ so that cell may have either a carry or sum output.

Figure 10:
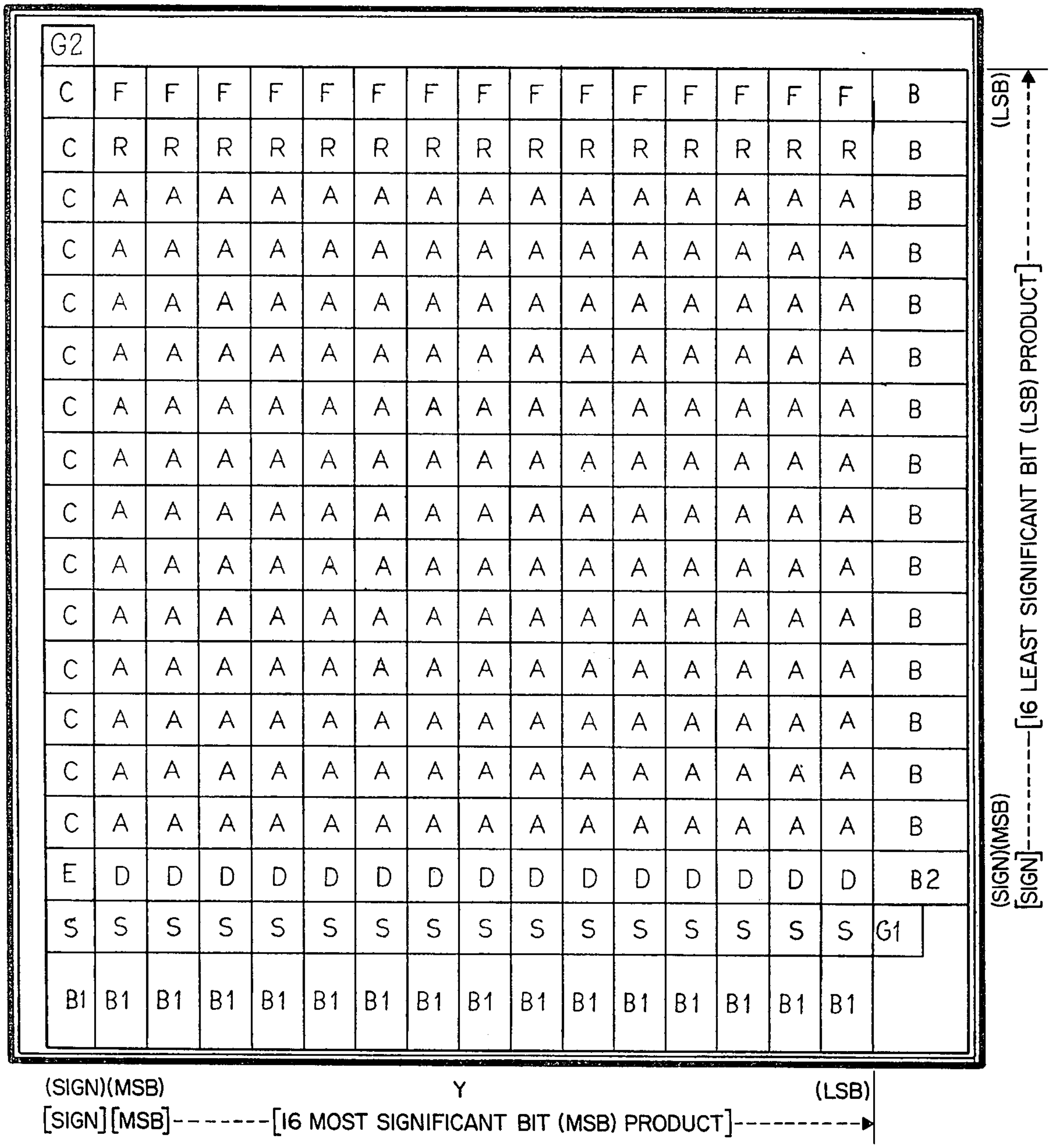
FIG. 10 is a layout diagram of a 16 × 16 multiplier, subdivided into several kinds of cells and employing non-threshold emitter follower logic according to the invention.

FIG. 10 illustrates how the multiplier is subdivided into several kinds of cells. Circuit diagrams of the different cells are shown in FIGS. 11–21. The functions performed by each cell is listed below:

| | |
|---|---|
| 'A' | (FIG. 11) — forms product $X_j*Y_k$ and adds |
| 'B' | (FIG. 12) — holding register for multiplier input and tri-state buffers for output of least significant half product |
| 'B1' | (FIG. 13) — holding register for multiplicand input and tri-state buffers for output of most significant half product |
| 'B2' | (FIG. 14) — holding register for sign bit of multiplier and tri-state buffer for output sign bit with least significant half of product |
| 'C' | (FIG. 15) — forms product $Y_0\overline{X}_j$ and adds; there is no sum input |
| 'D' | (FIG. 16) — forms product $X_0\overline{Y}_k$ and adds |
| 'E' | (FIG. 17) — forms sign bit $(X_0 + Y_0 - X_0*Y_0)$ and adds to the output of the matrix |
| 'F' | (FIG. 18) — forms product $X_{15}*Y_k$ |
| 'G1' | (FIG. 19) — forms product $X_0*2^{-15}$ |
| 'G2' | (FIG. 19) — forms product $Y_0*2^{-15}$ |
| 'R' | (FIG. 20) —forms product $X_{14}*Y_k$ and adds — no carry in |
| 'S' | (FIG. 21) — full adder to handle sums across matrix bottom. |

Figure 11:
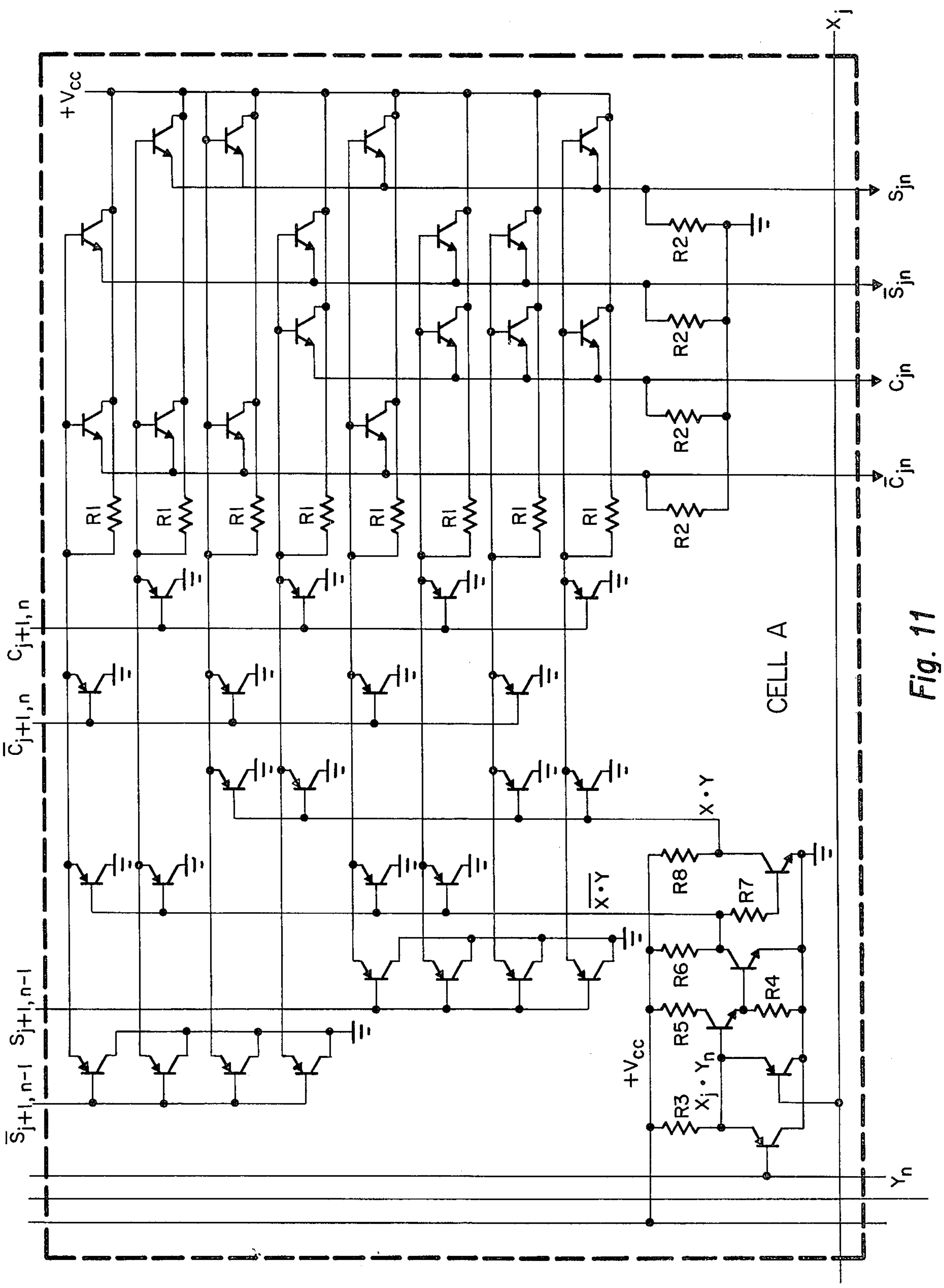
FIGS. 11–21 are schematic circuit diagrams of the different cells shown in FIG. 10.
Figure 12:
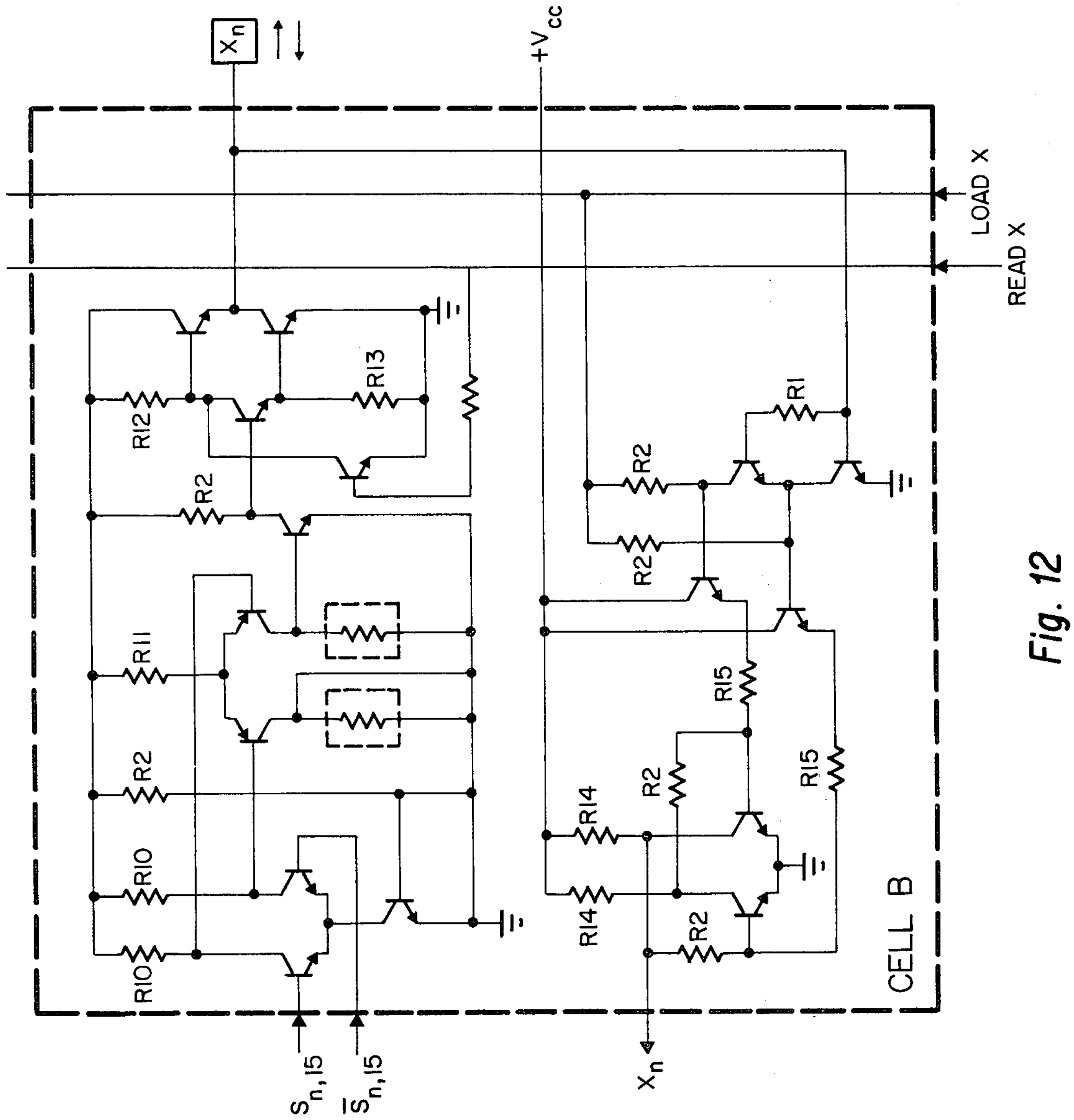
Figure 13:
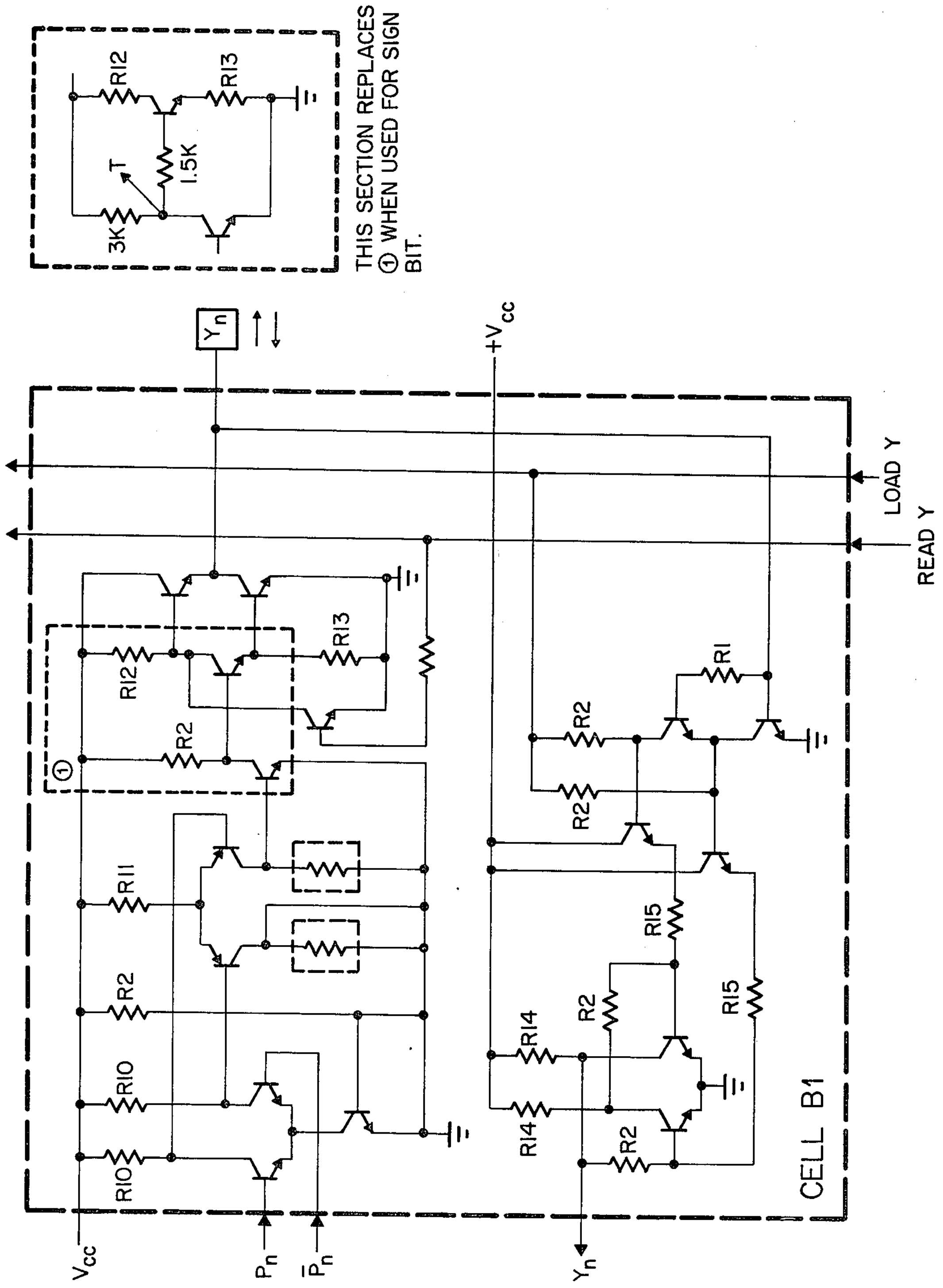
Figure 14:
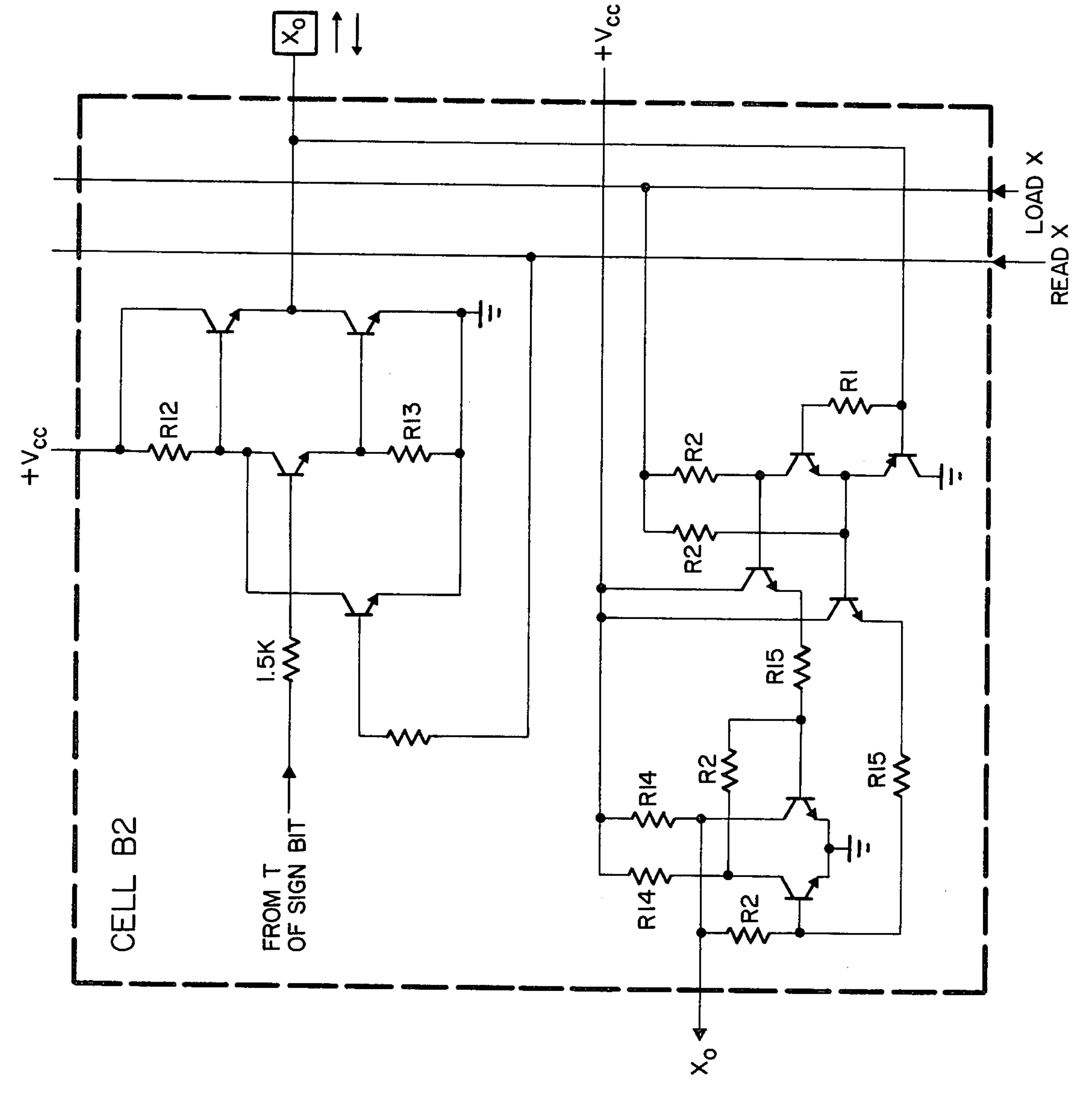
Figure 15:
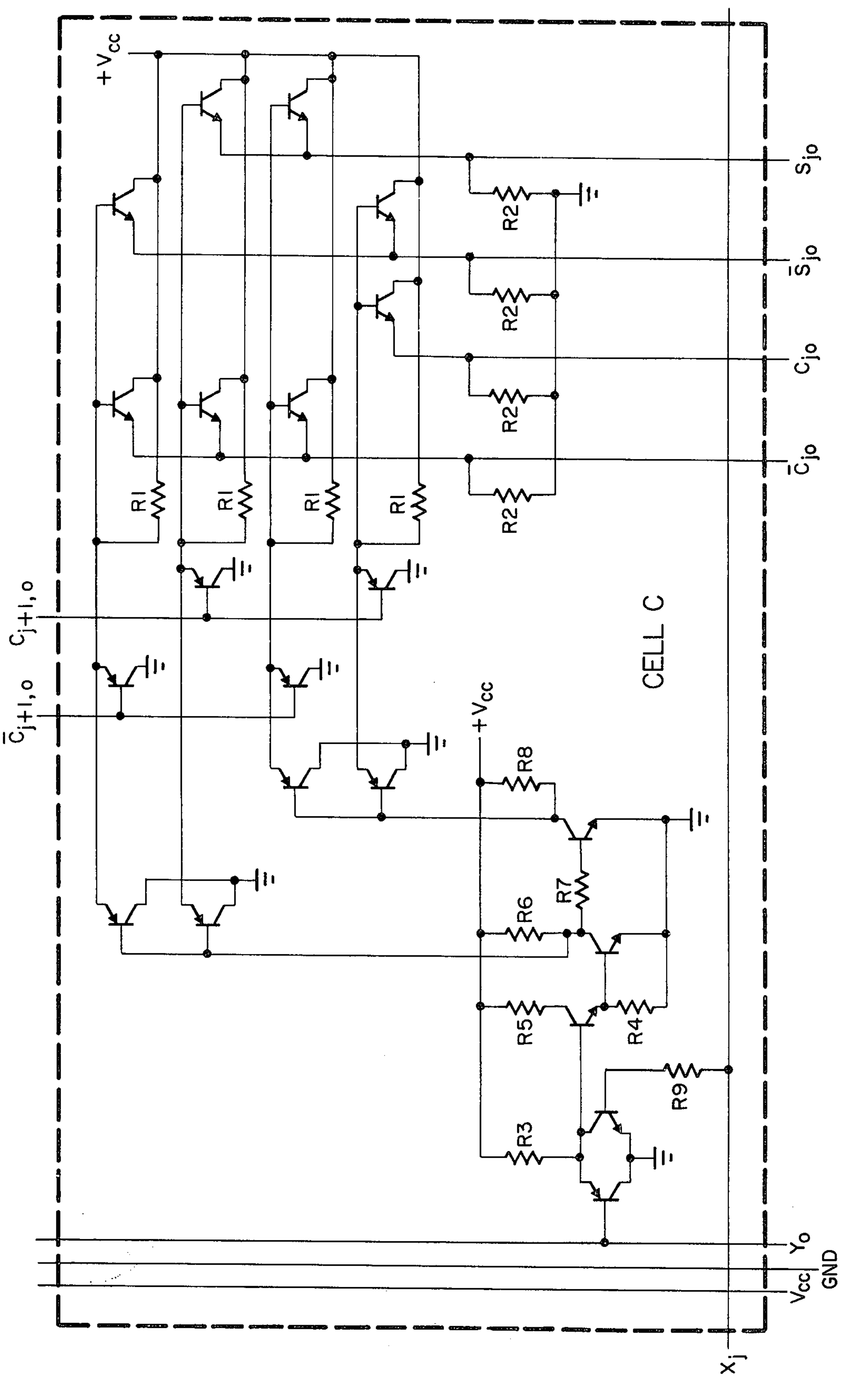
Figure 16:
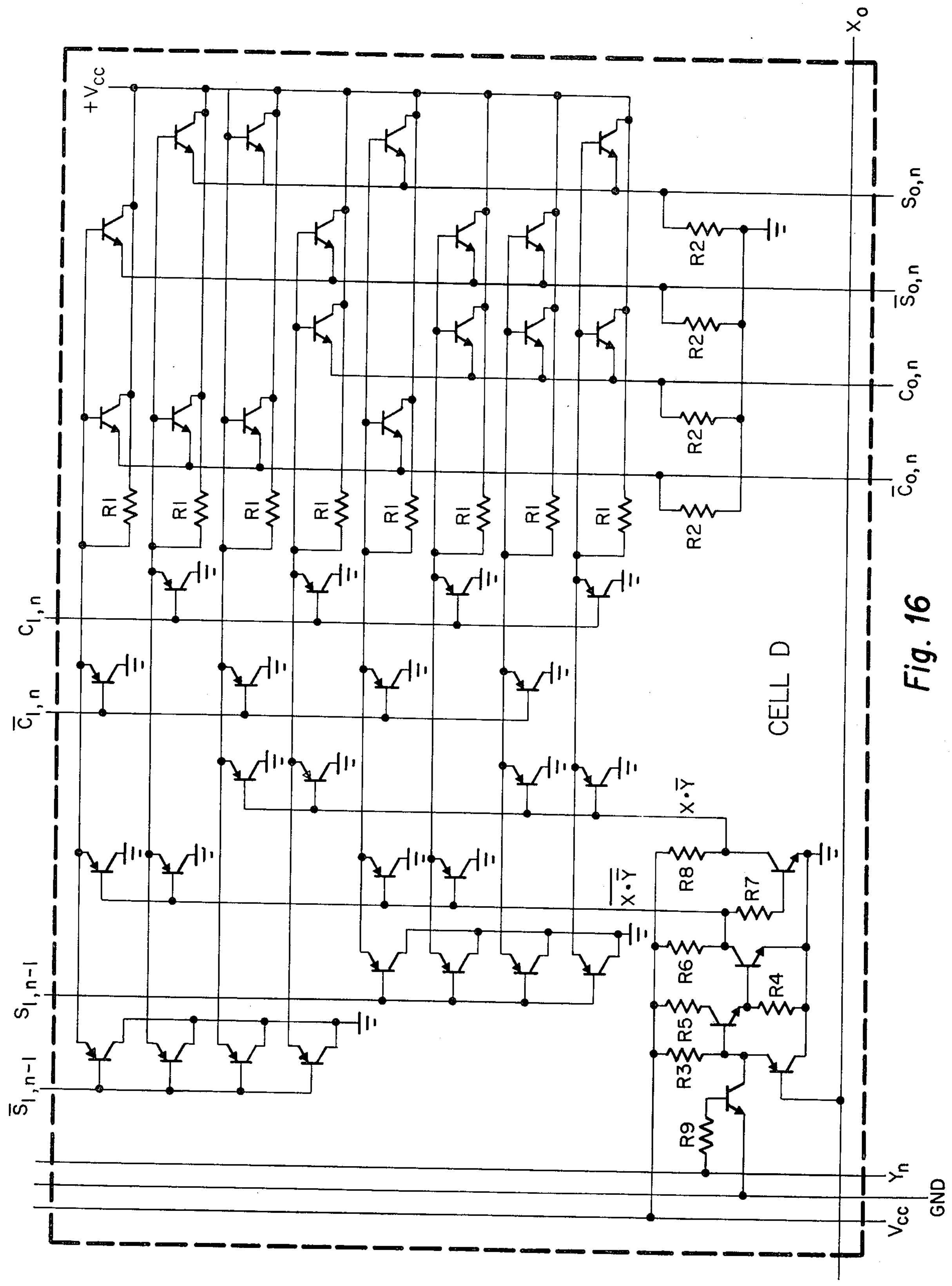
Figure 17:
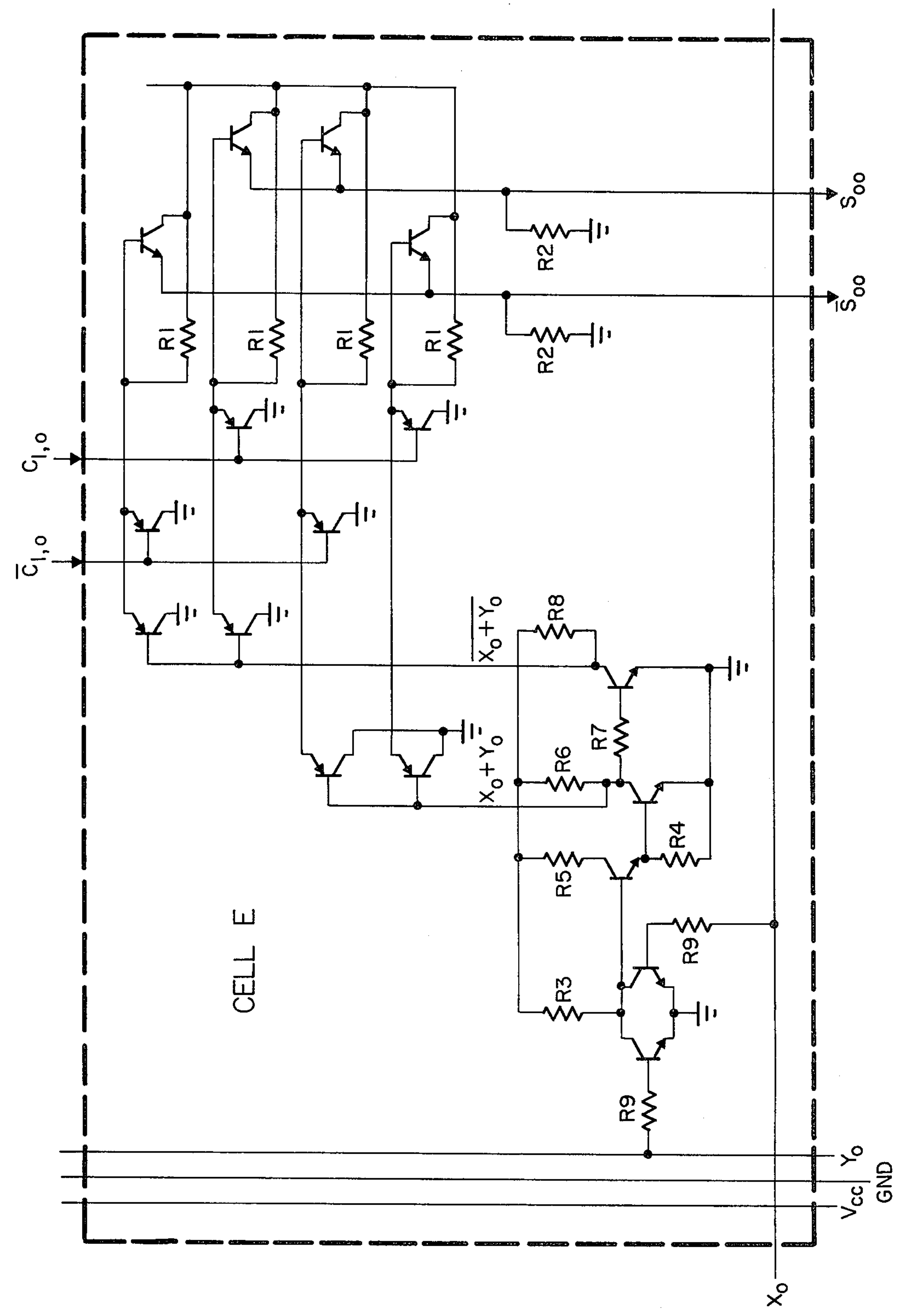
Figure 18:
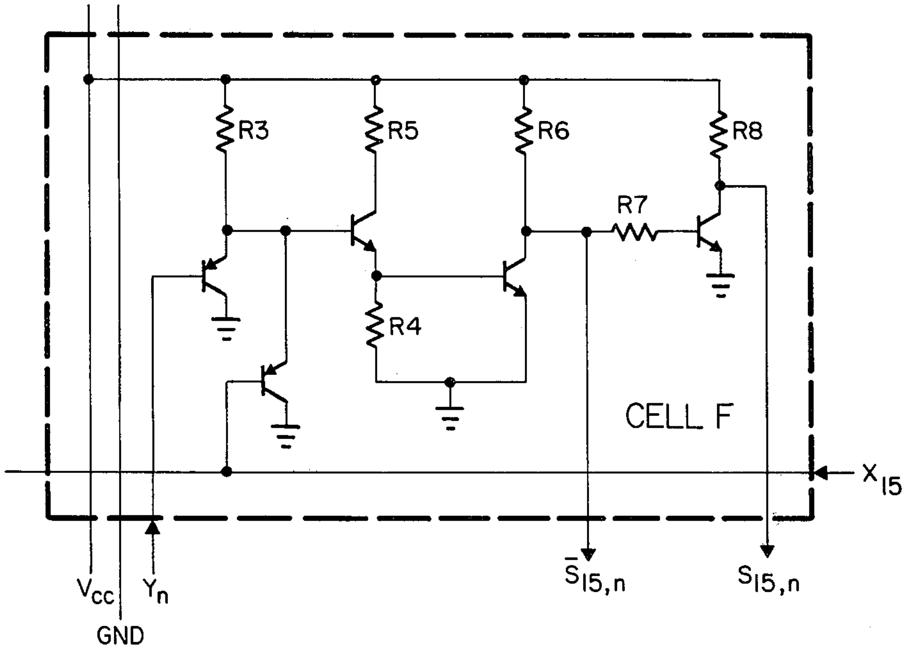
Figure 19:
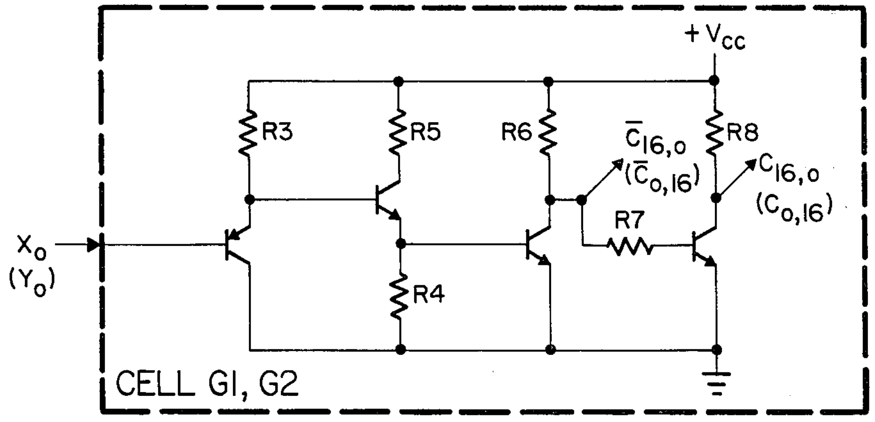
Figure 20:
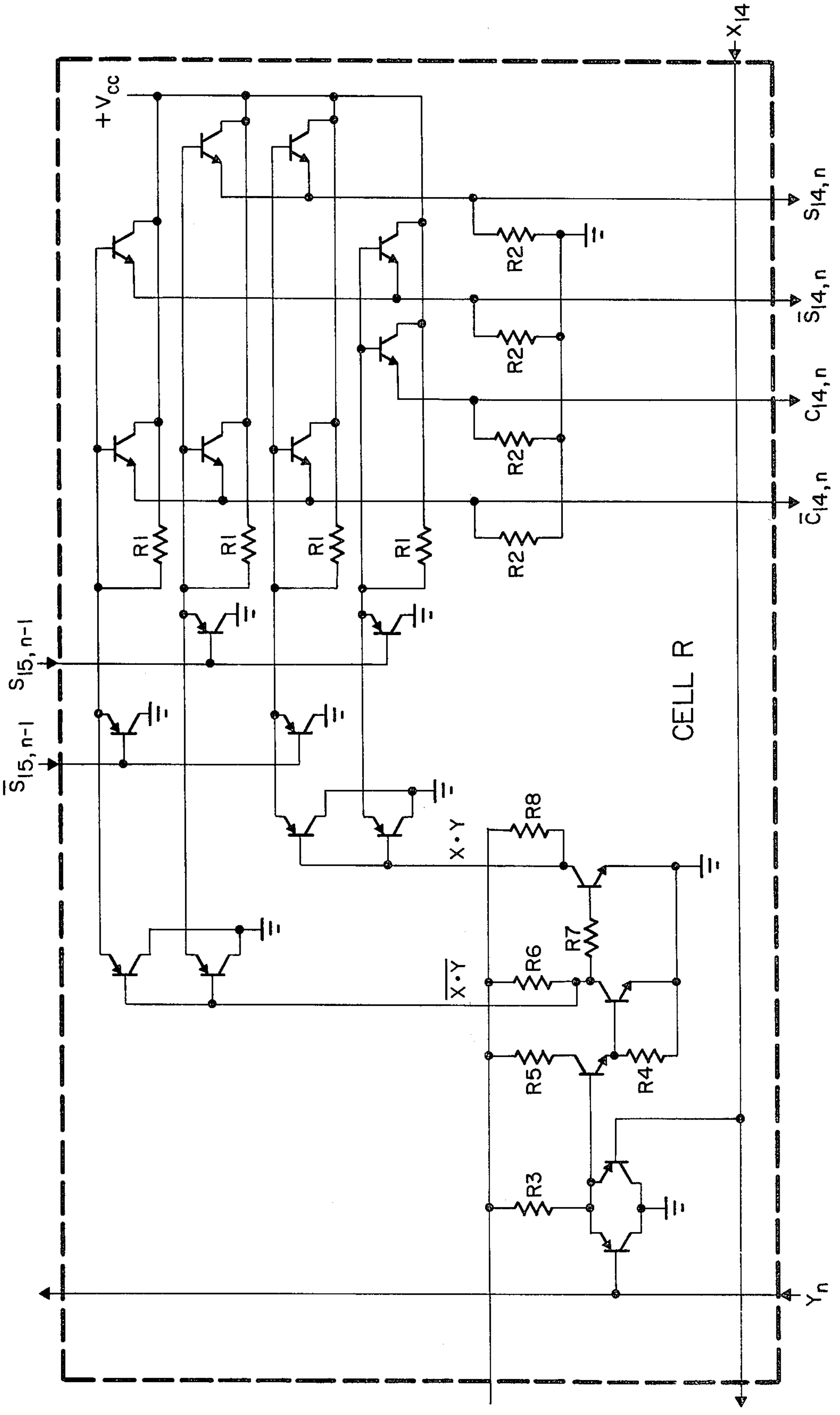
Figure 21:
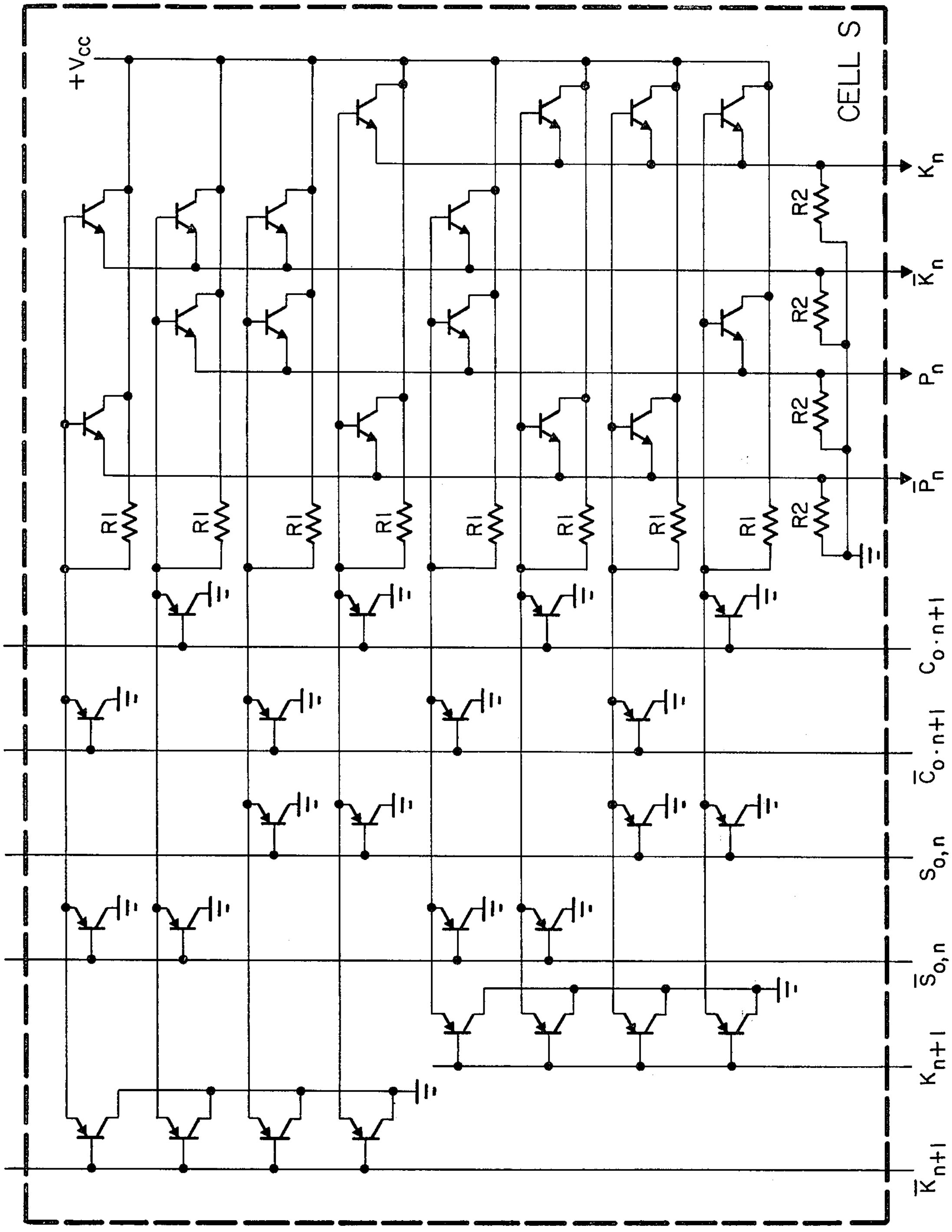
Figure 22:
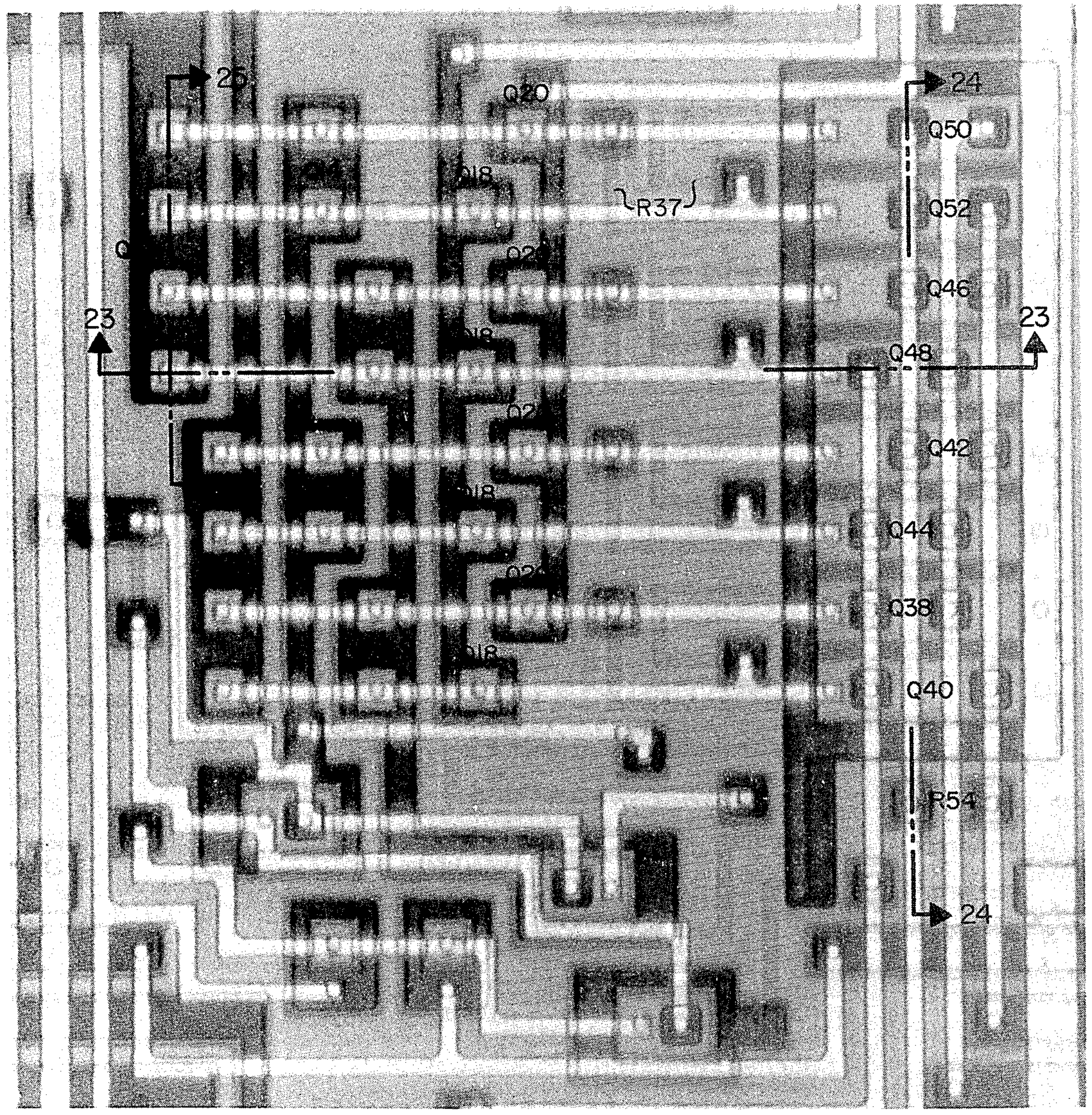
FIG. 22 is a photomicrograph of a portion of a single integrated circuit chip containing a 16 × 16 multiplier and showing one of the cells A, a circuit diagram of which is shown schematically in its entirety in FIG. 11, and another circuit diagram of which is shown in FIG. 8 with the circuitry for forming the one bit product omitted.
Figure 23:
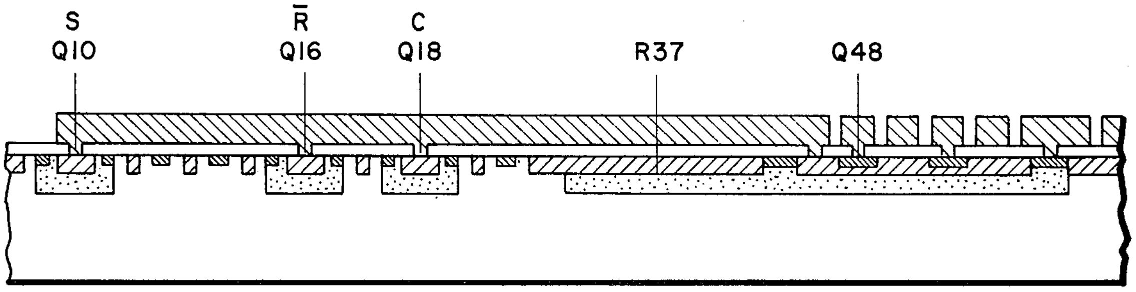
FIG. 23 is a section taken along line 23—23 of FIG. 22.
Figure 24:
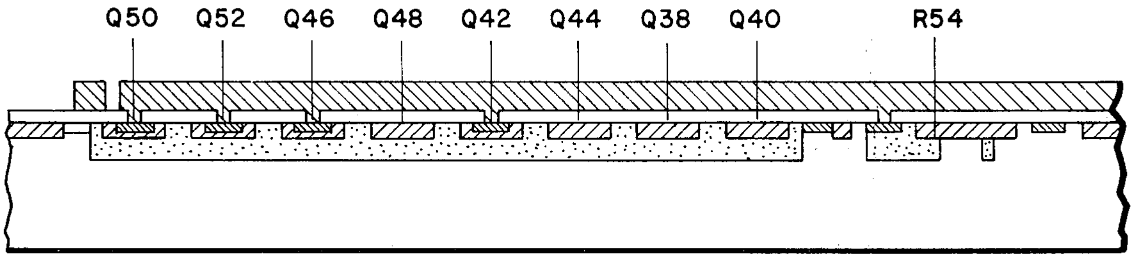
FIG. 24 is a section taken along line 24—24 of FIG. 22.
Figure 25:
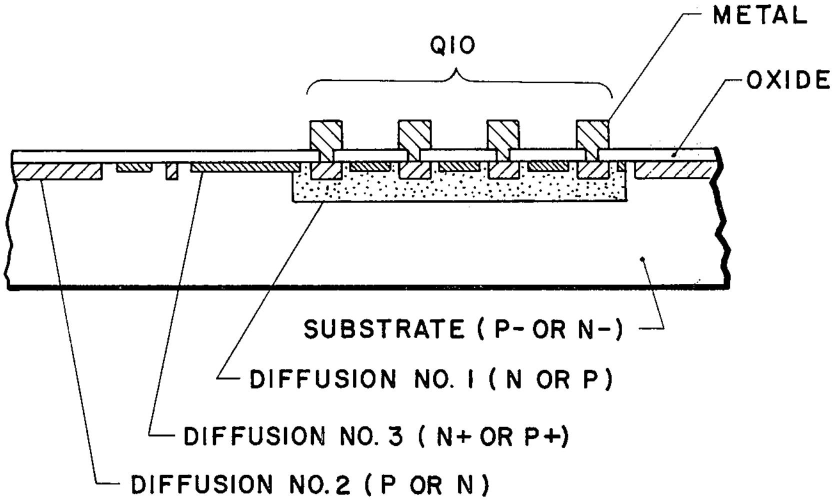
FIG. 25 is a section taken along line 25—25 of FIG. 22.

FIGS. 22–25 illustrate how cell A of FIG. 11 may be fabricated using the triple diffusion process. FIG. 22 is a photomicrograph of cell A in a completed 16 × 16 multiplier embodied in integrated circuit form on a single chip, and FIGS. 23, 24, and 25 are cross-sectional views of the same structure. The numerals appearing in these FIGS. 22 – 25 are used to identify the components shown schematically in FIG. 8 with the corresponding numerals. In FIGS. 22 – 25, the numerals preceded by the letter Q indicate that the component so identified is a transistor and those preceded by the letter R indicate a resistor.

In fabricating the cell A, three separate impurity depositions are performed in a substrate. Each impurity deposition may comprise thermal diffusion, ion implantation or a combination thereof. To form the circuit of FIG. 8, which operates with positive logic and uses a positive power supply, there is first provided a substrate of p- type semiconductor. A first deposition or diffusion of n type impurity is then made in selected surface regions of the substrate. Next a second deposition or diffusion of p type impurity is made in selected regions of the first diffused regions. Finally, a third diffusion of n+ type impurity is made in selected regions of the second diffused regions.

Considering first the pnp transistors Q10 to Q20 it will be seen in FIGS. 23 and 25 that the p- type substrate forms the common collector, the n type first diffusion forms the bases, and the p type second diffusion forms the emitters of those transistors.

Considering next the npn transistors Q38 to Q52 it will be seen in FIGS. 23 to 25 that the n type first diffusion forms the common collector, the p type second diffusion forms the bases, and the n+ type third diffusion forms the emitters of those transistors.

The resistors R37 and R54 are formed by using the conductivity of that part of the first diffusion that does not contain the second diffusion. The region so utilized is commonly referred to as the pinched collector region.

If one were to employ negative logic instead of positive logic, then one would use a negative power supply and reverse the impurities in the substrate and in the diffusions. Thus, the substrate would be n- type, the first diffusion would be p type, the second diffusion would be n type, and the third diffusion would be p+ type.

The use of multipliers is not limited to cases where the multiplier has the same word length as the multiplicand. Many applications arise where the word lengths are different. These applications may be handled in two ways: (1) A square multiplier can be used which has input word lengths equal to or greater than the word length of the longest number to be multiplied. Alternatively, a nonsquare multiplier can be built for the specific applications, with the length of the input registers being the same as the length of the expected numbers for each of the multiplier and multiplicand.

For instance, if a constant of 8 bits length is to multiply a series of data words each of 12 bits length, one may either use a 12 × 12 multiplier (and supply either the sign bit or its complement to the extra inputs for one word, depending on the number system) or one may elect to build an 8 × 12 multiplier. If M is the number of bits in the multiplier and N is the number of bits in the multiplicand, the number of bits required to express the product is M+N−1. For the case mentioned above, an 8 bit constant and a 12 bit data word, this results in a 19 bit product.

Usually, a multiplier will be designed to generate all the possible bits of the product; however, cases do arise where some of the possible bits will never be used, and in those cases a multiplier matrix may be designed which does not generate the unused bits in the first place. Referring again to the 8 × 12 case, if the data has only 12 bit accuracy, the resulting product has only 12 bit accuracy — the other 7 bits of the 19 bit product being used only for keeping track of the binary point. If one shifts the data words prior to multiplying such that the significant bits occupy the most significant portion of the input words, then the significant bits of the product are in the most significant part of the product word. In that case, the least significant portion of the product word may be discarded without loss of significance. This process is called truncation when these bits are simply discarded. If the most significant bit to be discarded is a 1, sometimes the least significant bit to be retained will have 1 added to it. This process is called rounding. For instance, in the 8 × 12 case mentioned previously, only 13 bits of the product need to be retained if the inputs are properly scaled before multiplying. For a fractional 2's complement machine, this implies that the numbers be expressed in floating point notation, and that the moduli have magnitudes between ½ and 1. The product therefore has modulus with magnitude between ¼ and 1. Thus only one extra bit needs be retained to keep track of the binary point.

For the example used here, this means that only 13 bits need be retained rather than 19 (the most significant bit would be examined, and if necessary the data would be shifted to the left, and 1 subtracted from the argument of the product to place the magnitude of the product modulus in the range 1 to ½. The 13th bit would then be discarded). Therefore, one may remove some of the least significant computational nodes. For this example, the least significant bit to be retained represents $2^{-12}$. The requirement governing the part of the matrix which may be deleted is therefore that the sum of all deleted computational nodes represent not more than $2^{-13}$. There are many combinations of deleted nodes which would satisfy this requirement. The one which would normally be chosen is the combination which deletes the greatest number of nodes.

What is claimed is:

1. A multiplier using a sequential-add algorithm to multiply together two binary numbers, said multiplier comprising:

a. a first set of signal lines extending in one direction for carrying signals representing the bits of a first number;

b. a second set of signal lines extending across said first set for carrying signals representing the bits of a second number, said first and second set of signal lines intersecting to form a matrix, with a single pair of intersecting signal lines forming a single matrix position; and c. logic circuit means for generating the appropriate cross product for each one of said matrix positions and adding that cross product to the appropriately weighted cross products generated at other ones of said matrix positions; the circuitry at each one of said matrix positions comprising 1. means including not more than six input lines for receiving from the circuitry at other matrix positions of said multiplier complementary binary signals representing sum or carry inputs;

2. means including not more than two lines for receiving external binary signals representing one bit of each of the numbers to be multiplied together;

3. a first plurality of logic circuits for forming the appropriate complementary binary signals representing cross products between the external signals;

4. a second plurality of non-threshold logic gates connected to receive the complementary binary signals from said first plurality of logic circuits and connected with said input lines to form not more than eight AND gates;

5. a third plurality of non-threshold logic gates connected to the outputs of said AND gates to form four OR gates; and 6. means including not more than four output lines connected to the outputs of said OR gates for transmitting to succeeding stages of said multiplier complementary binary signals representing sum and carry outputs respectively.

2. The invention according to claim 1, wherein said second plurality of non-threshold logic circuits comprise multiple emitter pnp transistors connected in emitter follower configuration and said third plurality of non-threshold logic circuits comprise multiple emitter npn transistors connected in emitter follower configuration.

3. The invention according to claim 2, wherein said pnp transistors and said npn transistors are physically arranged in a two-dimensional array in accordance with a truth table listing for a full adder.

4. The invention according to claim 2, wherein said pnp transistors are six in number, with each pnp trnsistor having four emitters and having a common base connected separately, one to each of said input lines;

eight separate load resistors for said pnp transistors;

the emitters of said pnp transistors being arranged in eight separate groups of three emitters each connected to a different one of said eight load resistors; and further wherein said npn trnsistors are eight in number, with each npn transistor having a common base connected to a separate one of said groups of three emitters;

each of said npn transistors having two emitters;

four load resistors for said npn transistors, one connected to each of said output lines;

the emitters of said npn transistors being arranged in four separate groups of four emitters each, each group connected to a different one of said four load resistors.

5. The invention according to claim 1, wherein said matrix is arranged to accommodate words of not more than 32 bits, and the complete multiplier is fabricated on a single semiconductor chip.

6. The invention according to claim 5 and further including a plurality of holding registers provided with input terminals for receiving signals from circuits external to said multiplier and also provided with output terminals connected to supply signals to said first and second sets of signal lines.

7. The invention according to claim 5, wherein said matrix is arranged to operate on numbers in the two's complement number system.

8. The invention according to claim 6 and further including a plurality of tri-state buffers having input terminals connected to appropriate ones of said output lines representing sum outputs from said multiplier matrix, and having output terminals connected to said input terminals of said holding registers.

9. The invention according to claim 8, wherein said matrix is arranged to accommodate words of 16 bit length for each of the multiplier word and the multiplicand word, respectively.

10. The invention according to claim 8, wherein said matrix is arranged to accommodate words of any bit length less than 32 for each of the multiplier word and the multiplicand word, respectively, and where the bit length of the multiplier word and the multiplicand word are not the same length.

11. The invention according to claim 10, where the product is truncated to a bit length less than the sum of the multiplicand bit length and the multiplier bit length.

12. A full adder, comprising:

at least six input terminals for receiving complementary binary signals representing one bit product inputs, sum inputs, and carry inputs, respectively;

a first plurality of non-threshold logic circuits connected with said input terminals to form eight AND gates;

a second plurality of non-threshold logic circuits connected with the outputs of said AND gates to form four OR gates; and at least four output terminals connected to the outputs of said OR gates for coupling to external means complementary binary signals representing sum and carry outputs respectively.

13. The invention according to claim 12, wherein said first plurality of non-threshold logic circuits comprise multiple emitter pnp transistors connected in emitter follower configuration and said second plurality of non-threshold logic circuits comprise multiple emitter npn transistors connected in emitter follower configuration.

14. The invention according to claim 13, wherein said pnp transistors and said npn transistors are physically arranged in a two-dimensional array in accordance with a truth table listing for said full adder.

15. The invention according to claim 13, wherein said pnp transistors are six in number, with each pnp transistor having four emitters and having a common base connected separately to each one of said input terminals;

eight separate load resistors for said pnp transistors;

the emitters of said pnp transistors being arranged in eight separate groups of three emitters each connected to a different one of said eight load resistors; and further wherein said npn transistors are eight in number, with each npn transistor having a common base connected to a separate one of said groups of three emitters;

each of said npn transistors having two emitters;

four load resistors for said npn transistors, one connected to each of said output terminals;

the emitters of said npn transistors being arranged in four separate groups of four emitters each, each group connected to a different one of said four load resistors.

* * * * *